M. A. MULRONY.
WIRELESS TELEGRAPH TRANSMITTER OF THE PORTABLE TYPE.
APPLICATION FILED JULY 23, 1915.
1,216,720.
Patented Feb. 20, 1917.
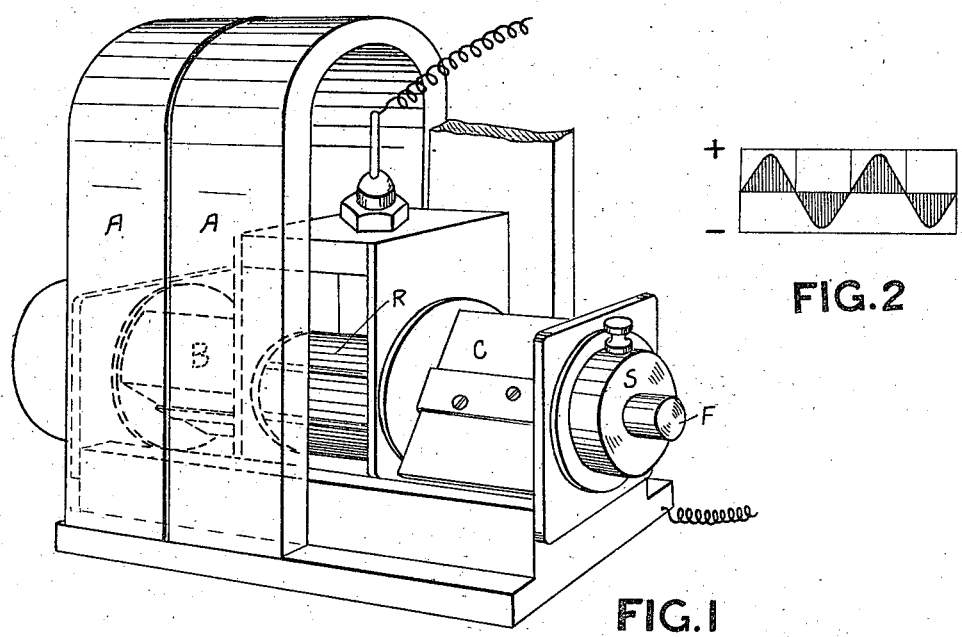
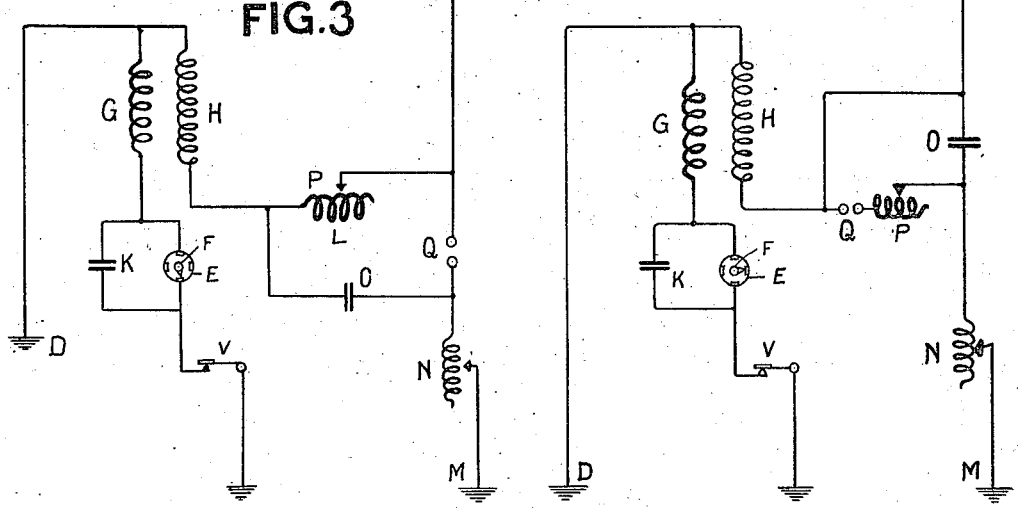

UNITED STATES PATENT OFFICE.

MARION ALVIN MULRONY, OF RANDWICK, NEAR SYDNEY, NEW SOUTH WALES, AUSTRALIA.

WIRELESS-TELEGRAPH TRANSMITTER OF THE PORTABLE TYPE.

1,216,720. Specification of Letters Patent. Patented Feb. 20, 1917.

Application filed July 23, 1915. Serial No. 41,449.

*To all whom it may concern:*

Be it known that I, MARION ALVIN MULRONY, a citizen of the United States, residing at Avoca street, Randwick, near Sydney, New South Wales, Australia, have invented certain new and useful Improvements in Wireless-Telegraph Transmitters of the Portable Type, of which the following is a specification.

This invention relates to wireless telegraph transmitters of portable type, usable for transmission of wireless messages over distances up to about 50 miles under normal conditions, and particularly adapted for use in military operations. The generator is usable also for obtaining current suitable for exciting Röntgen tubes and may therefore be used in emergencies for field hospital service.

According to this invention the current generator is a high frequency rotary transformer of the inductor type adapted to be rotated by means of a geared manual crank or by means of a belt or other mechanical connection to a rotating element in an automobile or motor cycle or other convenient motor. This generator is wound to supply a single phase high tension alternating current having 50–100 cycles period and energy equivalent to 200 watts or thereabout at a voltage of about 18000. The electrical quantities in this transformer are calculated to insure regulation by resonance, this resonance being obtained by providing adequate magnetic leakage so that reactances are not required in the external circuit under any condition between zero and full load. A sending key is included in the primary circuit, and the secondary circuit includes external to the generator a persistently oscillating circuit coupled to a freely radiating circuit, or a charging circuit associated with a freely radiating circuit excited with unidirectional impulses. The radiator is an air wire adapted to be raised on a telescopic bamboo mast.

Construction of the generator according to a particular system is essential to the successful operation of the invention. This necessary system of construction will now be described briefly with reference to the accompanying drawing, in which Figure 1 is a perspective view showing the essential elements of the generator; and Fig. 2 is a diagram of the current wave obtained from the generator; Fig. 3 is a diagrammatic sketch of the operative element of the generator and of the wiring and apparatus external to the generator and constituting the oscillating and radiating circuits. Fig. 4 is a diagrammatic sketch showing an alternative arrangement of the external circuits.

The generator field comprises two or more permanent magnets A, and two rotary magnetic flux changing pole armatures B and C which are fixed to the shaft F in planes at right angles to each other. The transformer coils are fixed; they are located between the pole changers B and C and comprise a primary coil (G) and a secondary coil (H). One terminal of each coil is earthed at D, most conveniently through the machine frame. The outer terminal of the primary passes to an automatic circuit breaker E arranged to break the primary circuit four times per revolution at the peak of each half of the generator wave. The circuit breaker is carried on the rotary shaft F, and the outer terminal of the circuit breaker is earthed through a sending key V. A condenser K to inhibit sparking at the circuit breaker E is shunted around the circuit breaker. The design of the coils and cores is such that good regulation over the full range is obtained by permitting electrical losses to occur through magnetic leakage.

The outer terminal of the secondary winding is connected to the oscillating circuit L, (Fig. 3) the foot M of which is earthed. In the oscillating circuit O is a condenser, P a variable tuning inductance, and Q a spark gap. In practice, the electric values are adjusted to produce oscillations in the radiator having a length of 150 to 200 meters. A variable loading inductance N is inserted above or below the spark gap, in the radiator circuit. In the alternative circuit arrangement shown in Fig. 4 the coupling to the aerial is electrostatic through the condenser O.

The transformer circuits may be planned according to existing practice, whereby an exciting circuit is caused to energize a freely radiating circuit with uni-directional impulses.

The drawings indicate clearly the construction of the rotary transformer by means of which four sine waves are produced per revolution, Fig. 2 showing a diagram of the wave.

The base plate of the generator is of non-magnetic material, and the magnets are provided with pole pieces between which the flux changing pole armatures B and C work with the usual small gap. These pieces B and C are iron blocks, preferably laminated, which are fixed on the shaft F with intervening non-magnetic thimbles so as to provide a free path for the magnetic flux through the primary coils of the transformer. They are set at right angles to each other so that there is a change in the magnetic flux four times for each revolution of the shaft. The circuit breaker operates to break the primary circuit appropriately four times per shaft revolution so as to procure the desired uni-directional impulses. The transformer coils G H are wound on the stationary bobbin R, and the interrupter is contained in the case S, its rotary element being carried on the shaft. The position of two of the permanent field magnets is shown at A Fig. 1. The whole of the wiring is secreted in the machine structure except the ground wire and the circuit wires to the sending key and to the charging or exciting circuit.

What I claim as my invention and desire to secure by Letters Patent is:—

1. A short distance wireless telegraph transmitter consisting of a high frequency rotary transformer of the inductor type designed to secure regulation by magnetic leakage, in combination with an automatic circuit breaker and a sending key in the primary circuit thereof; an oscillating exciting circuit charged by the secondary circuit of said transformer; and a tuned aerial circuit energized by said exciting circuit.

2. A short distance wireless telegraph transmitter, comprising a rotary transformer of the inductor type with means in its primary circuit for interrupting flow of current therein and means associated electrically with its secondary circuit for radiating wave energy therefrom, said transformer consisting of fixed primary and secondary coils designed to permit magnetic leakage and thereby effect regulation, and located between two flux changing armatures of high permeability mounted in crossed planes on a rotary shaft in the field of permanent magnets located at either side of said coils, and a circuit breaker on said shaft in parallel with a condenser in the primary circuit.

In testimony whereof I have affixed my signature in presence of two witnesses.

MARION ALVIN MULRONY.

Witnesses:
S. BECK,
W. J. DAVIS.

Copies of this patent may be obtained for five cents each, by addressing the "Commissioner of Patents, Washington, D. C."